(12) United States Patent
Oz et al.

(10) Patent No.: US 6,879,634 B1
(45) Date of Patent: Apr. 12, 2005

(54) METHOD AND SYSTEM FOR TRANSMITTING MEDIA STREAMS OVER A VARIABLE BANDWIDTH NETWORK

(75) Inventors: Ran Oz, Modiin (IL); Nery Strasman, Ramat Gan (IL)

(73) Assignee: Bigband Networks Inc., Redwood City, CA (US)

(*) Notice: Subject to any disclaimer, the term of this patent is extended or adjusted under 35 U.S.C. 154(b) by 0 days.

(21) Appl. No.: 09/461,859

(22) Filed: Dec. 15, 1999

Related U.S. Application Data
(60) Provisional application No. 60/153,347, filed on Sep. 10, 1999, provisional application No. 60/139,649, filed on Jun. 17, 1999, and provisional application No. 60/136,006, filed on May 26, 1999.

(51) Int. Cl.⁷ .............................................. H04N 7/18
(52) U.S. Cl. .............................. 375/240.26; 375/240.25
(58) Field of Search ....... 348/7–13; 375/240.25–240.29

(56) References Cited

U.S. PATENT DOCUMENTS

| | | | |
|---|---|---|---|
| 5,216,503 A | 6/1993 | Paik et al. ................... 358/133 |
| 5,629,736 A | 5/1997 | Haskell et al. ............... 348/387 |
| 5,847,760 A | 12/1998 | Elmaliach et al. .......... 348/390 |
| 5,966,120 A | 10/1999 | Arazi et al. .................. 345/327 |
| 6,014,694 A | * 1/2000 | Aharoni et al. ............. 370/232 |
| 6,057,884 A | * 5/2000 | Chen et al. .................... 348/42 |
| 6,124,878 A | * 9/2000 | Adams et al. ............... 370/229 |
| 6,266,817 B1 | * 7/2001 | Chaddha .................. 348/413.1 |
| 6,501,997 B1 | * 12/2002 | Kakino ........................ 700/28 |
| 6,519,285 B2 | * 2/2003 | Yamaguchi et al. ... 375/240.12 |

\* cited by examiner

*Primary Examiner*—Andy Rao
(74) *Attorney, Agent, or Firm*—Blakely Sokoloff Taylor & Zafman LLP (57) ABSTRACT

Method for re-multiplexing a plurality of streams including the steps of: compressing each of the streams at a plurality of compression rates, generating a base layer and a plurality of supplemental layers for each of the streams and storing each in a level ordered queue array, retrieving data from the base layer queue and retrieving data from subsequent level queues, so as to fill out the available overall bandwidth.

67 Claims, 10 Drawing Sheets

METHOD AND SYSTEM FOR TRANSMITTING MEDIA STREAMS OVER A VARIABLE BANDWIDTH NETWORK

CROSS-REFERENCE TO RELATED CASES

This claims priority to and the benefit of each of the following U.S. Provisional Applications: Ser. No. 60/136,006, filed on May 26, 1999; Ser. No. 60/139,649, filed on Jun. 17, 1999; and Ser. No. 60/153,347, filed on Sep. 10, 1999.

FIELD OF THE INVENTION

The present invention relates to methods and systems for transmitting media streams in general, and to methods and systems for transmitting media streams over variable bandwidth communication lines, in particular.

BACKGROUND OF THE INVENTION

Methods and systems for transmitting media streams over variable bandwidth channels, are known in the art.

U.S. Pat. No. 5,847,760 issued to Elmaliach et al. and entitled "Method for Managing Video Broadcast", is directed to a method for broadcasting compressed digital video signals. An encoder encodes each video frame according to the maximal bit rate, the half-maximal bit rate, and the quarter of the maximal bit rate. Each frame contains a plurality of a group of pictures (GOP). Each frame contains the same number of GOP's, and the GOP's are placed in the same order in all three types of frames. A transmitter detects the available bandwidth in the communication link, and provides this information to a controller. The controller selects one of the three types of encoded frames. If the available bandwidth is maximal, the controller selects the maximal bit rate frame type. If the available bandwidth is less than the maximal but more than half, the controller selects the half-maximal frame type, and if the available bandwidth is less than half the maximal, then the controller selects the quarter bit rate frame. A receiver receives the compressed frame from the transmitter and forwards it to a decoder, which decodes the frame and displays it on a display.

Methods for multiplexing a plurality of media streams into a single channel, where each media stream is assigned a different bandwidth, are also known in the art. One such method analyzes the activity in the streams and provides feedback to the encoders to encode according to a selected bit rate.

The Rate-Mux 300, Cisco V-bits Corp. implements another method in which the unit's programmable statistical re-multiplexing engine performs real-time CBR (Constant Bit Rate) and VBR (Variable Bit Rate) rate conversion and bit-stream manipulation processing to the input streams. Using a statistical model, the processed streams are then recombined into a highly efficient, multiplexed program transport stream for retransmission.

U.S. Pat. No. 5,966,120 to Arazi et al, is directed to "Method and apparatus for combining and distributing data with pre-formatted real-time video". This reference describes a system, which transmits a plurality of streams via a constant bit rate channel. Each of the streams can be of a variable bit rate channel but the system assures that the total sum of all if the streams at any given point in time does not exceed the channel bandwidth, even if from time to time, not all of it is fully used. The system described in this reference attempts to make use of excess bandwidth, which is variably available and insert other types of data therein, such as commercials. This system requires a client unit at the receiving end to extract the transmitted streams and the embedded additional data.

U.S. Pat. No. 5,629,736 issued to Haskell et al. and entitled "Coded Domain Picture Composition for Multimedia Communications Systems", is directed to a method for composition of video signals. Up to four video signals from four sources are fed to the system. The bit rates of the four signals may be different. Each video signal is decoded and processed by a discrete cosine transformation processor. The four discrete cosine transformation processors are controlled by a controller, whereby the bit rates of all four signals are converted to a single bit rate. The four video signals of equal bit rates are then synchronized and multiplexed, and fed to a display unit as one video signal, to display the four video images simultaneously.

U.S. Pat. No. 5,216,503 issued to Paik, et al. and entitled "Statistical Multiplexer for a Multichannel Image Compression System", is directed to a system for compression of a plurality of video signals and decompression thereof. Each of a plurality of video signals is encoded by an encoder. The encoded video signals are multiplexed and transmitted as a single video signal to a receiver. The video signal is then demultiplexed and decoded by a number of decoders, each corresponding to an encoder at the transmitting end. Each decoder then outputs the original video signal encoded at the transmission end.

MPEG standard provides a dual layer method of encoding, which is called SNR scalability. According to this method, a stream is encoded into two encoded streams, a basic level stream and a supplemental enhanced level stream. The layering is performed once for the entire movie and not on a block level. Either the base layer or both layers can be used to produce the original stream. The layer selection decision has to be performed prior to transmission.

SUMMARY OF THE PRESENT INVENTION

It is an object of the present invention to provide a novel method and system for scalable transmission of media streams, which overcomes the disadvantages of the prior art.

In accordance with a preferred embodiment of the present invention, there is provided a method for providing scalable bandwidth transmission of a media stream. The method includes the steps of: determining a plurality of compression levels for the media stream, and defining the highest level of compression of the compression levels as a base level. The can further include the steps of compressing the media stream according to the compression levels, thereby producing a plurality of compressed versions of the media stream, and defining a selected one of the compressed versions a base layer. The selected compressed version is compressed according to the base level. The method can further include the step of producing a supplemental layer for each successive pair of the compressed versions.

The method can also include the step of providing the base layer as a reconstructed media stream or producing a reconstructed media stream from the base layer and at least a portion of at least one of the supplemental layers.

According to the available bandwidth, base layer and successive supplemental layers, can be transmitted to a remote location. Alternatively, a reconstructed media stream can be transmitted to a remote location, either in an encoded or a decoded format.

The of reconstructed media stream can be packetized before transmitting to a remote location or intermediate storage thereof.

It is noted that the media stream can be any compressible stream such as an MPEG encoded media stream, an original media stream, a JPEG media stream, other types of elementary streams Video stream such as an audio stream, a data stream, complexed streams which have a plurality of other streams embedded therein, and the like.

In accordance with another aspect of the present invention, there is provided a method for reconstructing a portion of a media stream from a portion of a base layer stream and a respective portion of at least one supplemental layer stream including the step of adding the respective portion of at least one supplemental layer stream to the base layer stream.

In accordance with another aspect of the present invention, there is provided a method for providing scalable bandwidth transmission of a plurality of media streams. The method includes the steps of determining a group of compression levels for each of the media streams, and defining the highest level of compression of the compression levels of each the media streams, as a base level thereof.

The method can further include the steps of: compressing each of the media streams according to a respective one of the groups of the compression levels, thereby producing a group of compressed versions, for each of the media streams, and defining a selected one of the compressed versions of a selected group of compressed versions, a base layer. The selected compressed version is compressed according to the base level, of the selected group of compression levels.

The method can further include the step of producing a supplemental layer for each successive pair of the compressed versions of a selected group, thereby defining a group of supplemental layers. The method can further include the steps of associating between portions of different ones of the base layers, and associating between portions of different ones of the supplemental layers of the same order, of different ones of the groups. For example, associating between a portion of the second layer of a first media stream and a respective portion of the second layer of a second media stream.

The portions of the associated base layers can then be provided as reconstructed media streams. Alternatively, the method can include a step of producing reconstructed media streams, each from a respective one of the portions of the associated base layers and from at least one of a respective one of the portions of the supplemental layers. It is noted that the decision of which is the highest level used in the reconstruction process can be made according to a plurality of considerations such as available bandwidth, received packets at each layer, etc.

The associated portions of the base layers and supplemental layers can be transmitted to a remote location. Alternatively, the method can further include the step of transmitting the reconstructed media streams to a remote location. An optional step of the invention includes packetizing the reconstructed media streams, (for example, according to MPEG Transport) which then can be transmitted packetizes.

In accordance with another preferred embodiment of the present invention, there is provided a method for reconstructing portions of media streams from portions of a base layer streams and a respective portions of at least one supplemental layer streams. The method includes the steps of: detecting an association between each the base layer streams and at least a respective portion of at least one respective supplemental layer streams, and adding each of the base layer streams and the associated respective portion of at least one respective supplemental layer.

$$\text{reconstructe\_stream} = \text{base\_layer} + \sum_{i=0,1,2\ldots k} \text{supplemental\_layer}_i$$

In accordance with another preferred embodiment of the present invention there is provided a scalable bandwidth transmission media stream generating apparatus. The apparatus includes a media analyzer and a layering generator connected to the media analyzer. The media analyzer receives a media stream and determines a layering structure therefore. The layering generator processes the media stream according to the layering structure, thereby producing a base layer and a plurality of supplemental layers.

The apparatus can further include a storage unit, connected to the layering generator, wherein the storage unit is divided to a plurality of queues and each the queues stores a selected one of the base layers and the supplemental layers.

The apparatus can further include a routing controller, connected to the storage unit, for retrieving selected successive ones of the base layers and the supplemental layers. In addition, the apparatus of the invention can also include a layer assembler, connected to the routing controller, for producing a reconstructed media stream from the base layer and at least a successive one of the supplemental layers, received from the routing unit.

In accordance with a further preferred embodiment of the present invention, there is thus provided a scalable bandwidth transmission media stream generating apparatus. The apparatus includes a plurality of media analyzers, and a plurality of layering generators, each associated with and connected to a selected one of the media analyzers. Each of the media analyzers receives a different media stream and determines a layering structure therefore. Each of the layering generators processes the media stream according to the layering structure, thereby producing a base layer and a plurality of supplemental layers.

The apparatus can further include a storage unit, connected to the layering generator. The storage unit is divided to a plurality of queues, each storing a selected one of the base layers and the supplemental layers. For example queue (0) stores the base layers on all of the streams, queue(1) stores the first supplemental layer of all of the streams, queue(2) stores the second supplemental layer of all of the streams, whose layering structure includes at least two supplemental layer and so on and so forth.

The apparatus can also include a routing controller, connected to the storage unit, for retrieving selected successive ones of the base layers and the supplemental layers, as well as a layer assembler array, connected to the routing controller, for producing a reconstructed media streams from the base layers and at least a successive ones of the supplemental layers, received from the routing unit.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a novel method and system for separating a media stream into layers, each defining a different quality, each added onto a lower quality one, for transmitting the layers over a variable bandwidth communication line and for assembling the layers into a media stream at the receiving end.

Although the present invention is described predominantly in terms of the transmission and storage of video and audio information encoded in accordance with the MPEG format, the concepts and methods are broad enough to encompass distribution systems using other data compression techniques and other data formats. Throughout this detailed description, numerous details are specified such as program types and data stream structures, in order to provide a thorough understanding of the present invention.

Both MPEG-1 (ISO/IEC 11172) and MPEG-2(ISO/IEC 13818) have a few chapters. The following description mainly addresses two of them. Chapter 1 (11172-1,13818-1) is directed to Systems. In MPEG-2 this includes Transport (herein after referred to as Systems or Transport, which is a specific System type). Chapter 2 (11172-2, 13818-2) is directed to video compression (herein after referred to as MPEG-Video).

MPEG-Video sets rules on how to encode video and what is required in order to have a legal MPEG-Video stream. It requires buffer handling. An MPEG Video stream is called an elementary stream. Other elementary streams can be audio streams (Dolby AC-3, MPEG-Audio or anything else), data streams and any other stream.

The elementary streams can include any so-called private streams. A receiver can do whatever it desires with what it receives, providing that it includes the means to extract these private streams from the received data. Usually this would require some kind of client installed on the receiver in order to handle the private data as the transmitter intended.

MPEG-Systems also requires buffer handling. In principal, each elementary stream has its own buffer handling and the overall multiplexing, which is defined in MPEG-Systems, has its own buffer handling. A private stream has no specified buffer handling and it is up to the transmitter and receiver to process it according to their predetermined purpose.

A program includes one or more elementary streams. For example, the program can include one or more video streams (for example, in a multi angle case, where each video stream provides s different angle of the same clip), one or more audio streams and the like. MPEG Systems the provisions for defining which elementary streams define a program, and different timing instructions so that the streams will be synchronized. It is important to note that all timing considerations are done at the MPEG-Systems level. In addition, MPEG-Transport allows the transmission of one or more programs—all multiplexed on one stream. The standards provide the option to state which streams belong to which program. This is facilitated by the fact that every transmitted elementary stream has a unique identification (ID) number called PID (Packetized ID).

MPEG-Video can be provided at a constant bit-rate (CBR) or at a variable bit-rate (VBR). MPEG Transport can technically also be one of either but conventionally only CBR transport is used. Usually, each program may be VBR but their sum is CBR at the Transport's total bit rate.

The present invention provides a novel method, which multiplexes a plurality of VBR programs in such a way, that their sum never exceeds the total Transport bit rate and that no bandwidth be wasted. This is done by analyzing the encoded streams, altering them, producing new legal encoded streams and multiplexing the new streams into Transport format so that the total isn't exceeded and all the bandwidth is used and no client is required at the receiving end.

As stated above, the examples set forth in the following description are provided with respect to MPG ISO/IEC 11172-2 and ISO/IEC 13818-2 video compression standards. A picture, which is to be encoded includes either a complete frame, or a field, which is the even or odd lines of a complete frame. The above standards define three types of encoded pictures, an I-frame, a B-frame and a P-frame. An I-frame (Intra-frame) includes the entire information which is required to reconstruct the encoded picture. A P-frame (Predictive) includes information, which in combination with previously encoded P-frames and I-frames, can reconstruct the encoded picture. A B-frame (Bi-directional) includes information, which, in combination with previously encoded I-frames and P-frames, can reconstruct the encoded picture.

A picture to be encoded is divided into components at different levels. A slice includes a predetermined number of lines (for example 16). A block includes a matrix of 8×8 pixels. A macro-block includes a 2×2 matrix of luminance blocks (which results in a 16×16 matrix of pixels).

Each block of pixels is transformed using Discrete Cosine Transform (DCT) which produces a respective sequence of values. These values are then divided by a quantizing parameter, also called the quantizing scale and only the integer portion of the results, is kept. For example, if the DCT results in the following sequence 16, 5, 10, 2, 0, 4 and the quantizing scale is 6, then the resulting sequence is 2, 0, 1, 0, 0, 0. It is noted that a different quantizing value can be used for every macro-block.

After the DCT and quantizing stages, the set of values, preferably includes a large number of zero values. The values are further encoded using a method called Run Level Encoding (RLE), which transforms the sequence into pairs of number, a value (greater than zero) and the number of zero values that preceded it.

The present invention provides a method in which a quantized sequence is further quantized to a plurality of higher quantization levels (higher compression lower quality). The highest quantization level is set to be the base level. The output data includes the base level and the difference between each two adjacent levels, up to the original one.

The following description addresses a stream component, which is a single frame. It is noted, for the purpose of the present invention, that frame can be replaced by any other stream component such as a slice, a macro-block, a block, a field and the like.

Figure 1:
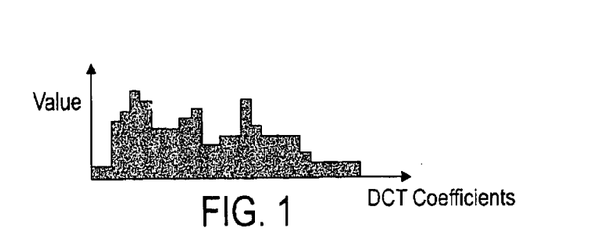
FIG. 1 is a visual representation of block DCT values, at a predetermined quantizing value.
Figure 2A:
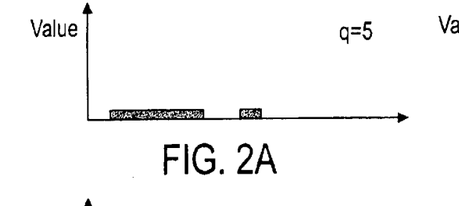
FIGS. 2A, 2B, 2C, 2D and 2E are visual representations of the block of FIG. 1, at different quantizing values, in accordance with a preferred embodiment of the present invention.

Reference is now made to FIG. 1, which is a visual representation of block DCT values, at a predetermined quantizing value, after basic quantizing. As seen in FIG. 1, most of the values are greater than zero. Reference is now made to FIGS. 2A, 2B, 2C, 2D and 2E, which are visual representations of the block of FIG. 1, at different quantizing values, in accordance with a preferred embodiment of the present invention. FIGS. 2A, 2B, 2C, 2D and 2E represent the block values at respective quantizing values of Q=5, 4, 3, 2 and 1 (e.g., FIG. 2A represents the integer portions of the results of a division of the values of FIG. 2E, by 5.

Figure 2B:
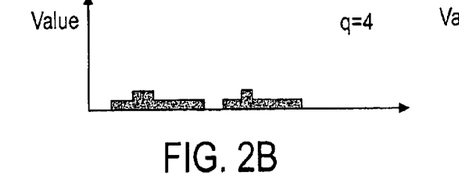
Figure 2C:
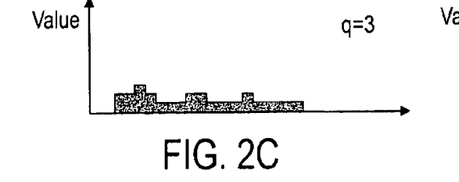
Figure 2D:
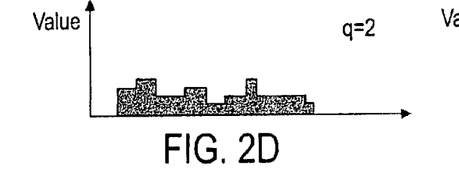
Figure 2E:
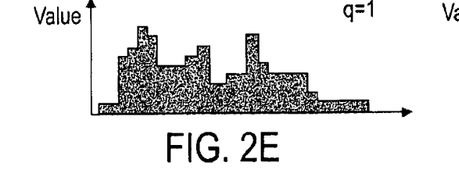
Figure 3A:
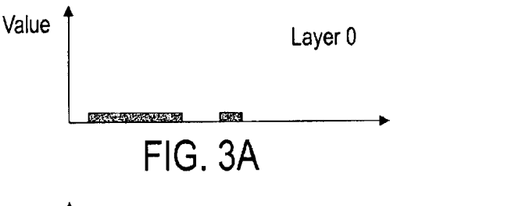
FIGS. 3A, 3B, 3C, 3D and 3E are representation of a layer structure, in accordance with another preferred embodiment of the present invention.
Figure 3B:
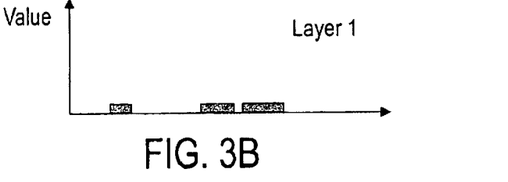
Figure 3C:
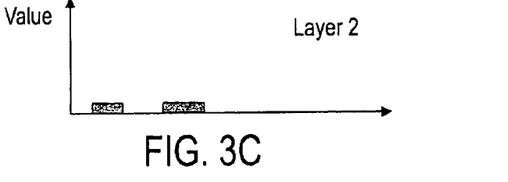
Figure 3D:
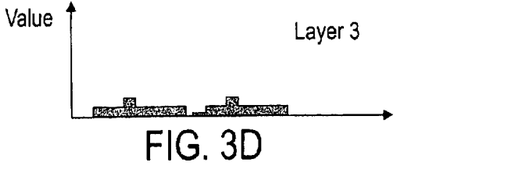
Figure 3E:
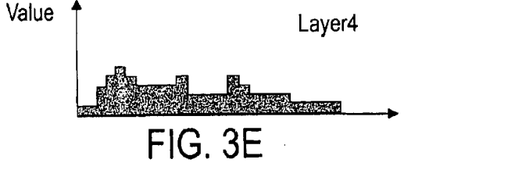

Reference is now made to FIGS. 3A, 3B, 3C, 3D and 3E, which are representation of a layer structure, in accordance with another preferred embodiment of the present invention. FIG. 3A is a visual representation of the block of FIG. 1, at the highest quantizing value and is identical to FIG. 2A. FIG. 3B represents the difference (Δ) between the representations of FIGS. 2A and 2B, so that adding the representation of FIG. 2B over the one of FIG. 3A, yields in the representation of FIG. 2B. similarly, FIG. 3C represents the difference (Δ) between the representations of FIGS. 2B and 2C, FIG. 3D represents the difference (Δ) between the representations of FIGS. 2C and 2D and FIG. 3E represents the difference (Δ) between the representations of FIGS. 2D and 2E.

The newly compressed frames at each of the compression levels (FIGS. 2A, 2B, 2C, 2D and 2E) can now be used to reproduce a representation of the media stream (deteriorated according to the compression level) or be sent to a far end of a communication network. Alternatively, the base layer (FIG. 3A) and as many successive supplemental layers (FIGS. 3B, 3C, 3D and 3E), can now be used to reproduce the media stream or be sent to a far end of a communication network. The present invention provides a further packetizing stage, which can be also be used for re-multiplexing of a plurality of media streams, as will be described further below.

Figure 4:
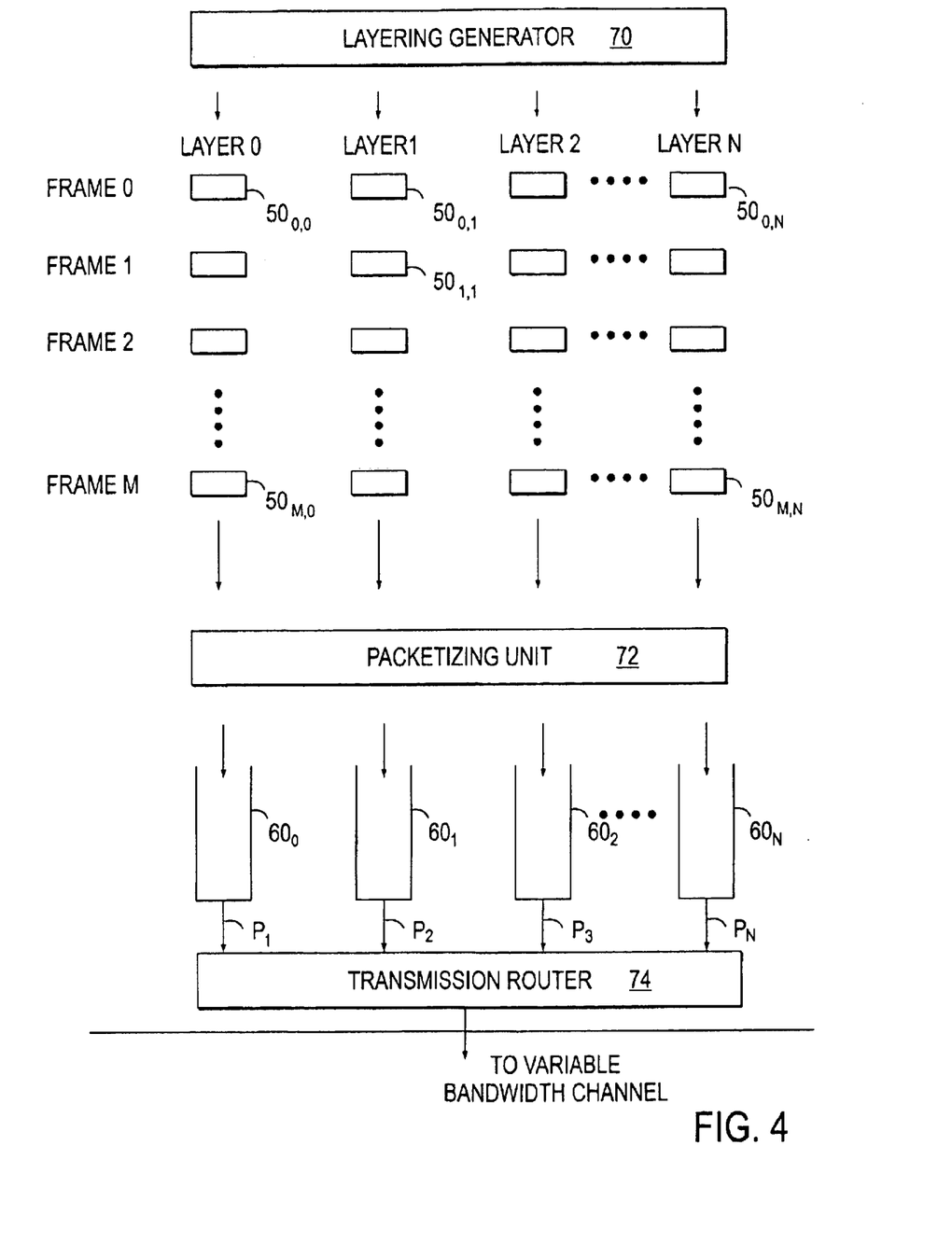
FIG. 4 is a representation of a packetization structure, in accordance with a further preferred embodiment of the present invention.

Reference is further made to FIG. 4, which is a representation of a layering and packetizing mechanism structure, constructed and operative in accordance with a further preferred embodiment of the present invention. The structure includes a layering generator 70, a packetizing unit 72, a plurality of queues, generally referenced 60 and a transmission router 74.

Each frame yields a plurality of frame representations, generally referenced $50_{i,j}$, where i denotes a frame index and j denotes a layer index. The first frame representations are provided at all of the compression layers from the base level, at the highest quantization level, to the rest, which are consecutive Δ portions for lower quantization levels. For example, frame representation $50_{0,0}$, is the representation of the first frame at the base layer (highest compression— lowest quality), frame representation $50_{0,1}$, is the representation of the first frame at the second layer level (lower compression—higher quality). Frame representation $50_{0,N}$, is the representation of the first frame at the last layer (lowest compression—highest quality). The same applies for frame M, references $50_{M,0}$ and $50_{M,N}$.

The frame representations $50_{i,j}$ are arranged in such a structure, so that each can be accessed individually, thereby enabling reconstruction of the original stream in a variety of ways, at different qualities, which can vary from frame to frame.

Packetizing unit 72, encapsulates the frame representations so that the original stream can be constructed from only some of them, where some packets are discarded. This aspect of the invention provides robustness, in situations where bandwidth decreases, and not all of the frame representations of a selected picture arrive in due time at the receiving end.

The packetizing unit 72 packetizes the frame representation, respective of a selected layer and provides the packets to respective layer queues $60_0$, $60_1$, $60_2$ and $60_N$.

At this stage, the packets from each selected ones of the queues are routed to an assembly unit. Many methods for routing packets are known in the art, each can be used for routing packets from the queues, according to a given priority scheme, such as random early detection (RED), weighted random early detection (WRED), and the like.

According to the present invention, the queues are managed according to a priority scheme, in which the base layer queue $60_0$ is assigned the highest priority $P_0$ and consecutive queues $60_1$, $60_2$ and $60_N$ are assigned respective descending priorities $P_1$, $P_2$ and $P_N$.

A packet within a queue, which was not transmitted within a predetermined period of time, is discarded and hence deleted, making room for new packets at the respective layer. This can be achieved in a plurality of ways. For example, each packet is assigned an expiration time stamp, before which the packet is considered valid for transmission and after which the packet can be discarded and deleted. The transmission router 74 collects packets from the queues 60, according to the priority scheme and transmits them over a variable bandwidth channel.

Figure 5:
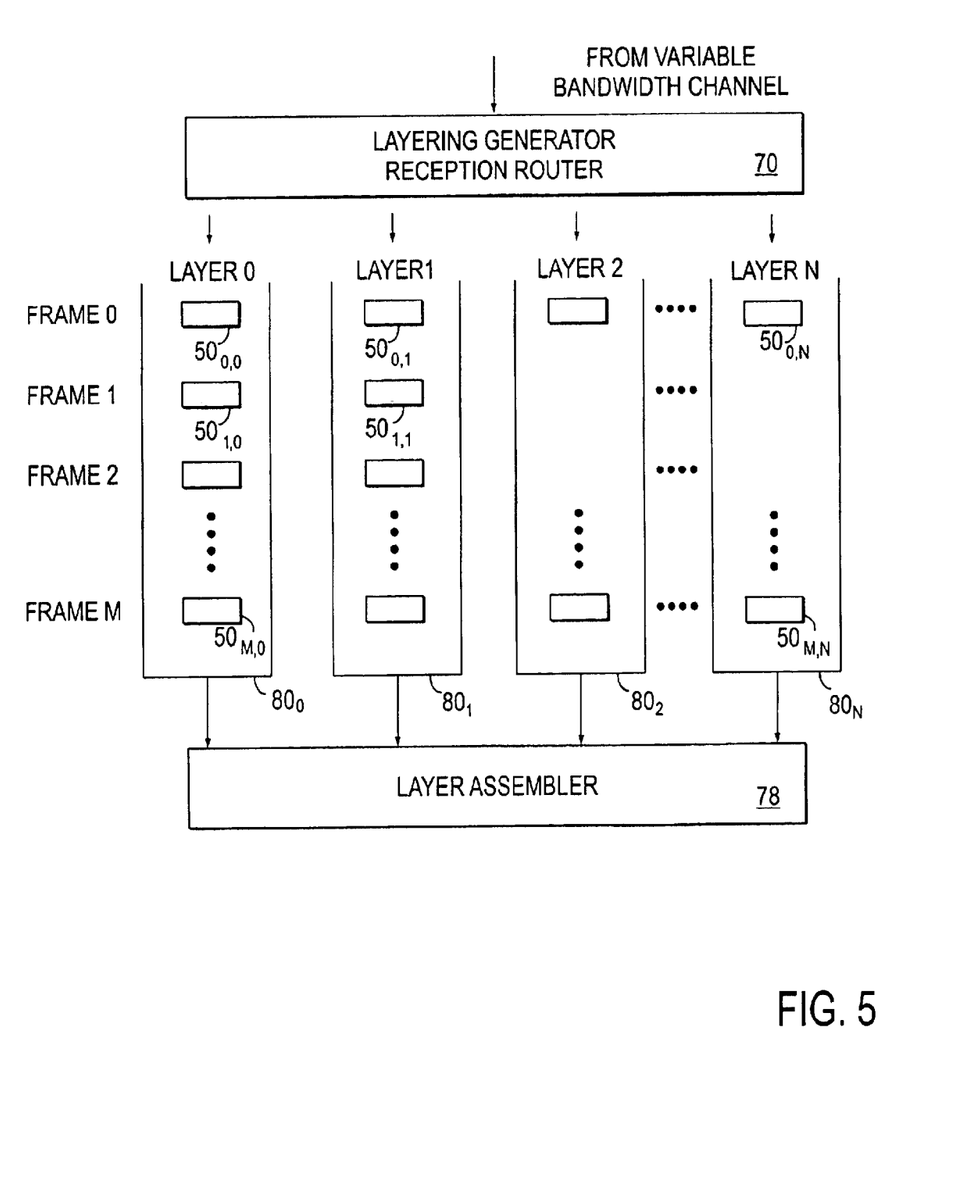
FIG. 5 is a schematic illustration of an assembly mechanism structure, constructed and operative in accordance with another preferred embodiment of the present invention.

Reference is further made to FIG. 5, which is a schematic illustration of an assembly mechanism structure, constructed and operative in accordance with another preferred embodiment of the present invention. The structure includes a reception router 76, a layer assembler 78 and a plurality of queues, generally referenced 80.

The reception router 76 receives a plurality of packets from the variable bandwidth and distributes them according to the respective layers, among queues $80_0$, $80_1$, $80_2$ and $80_N$. Base layer packets are directed to queue $80_0$, Layer 1 Δ packets are directed to queue $80_2$ Layer 2 Δ packets are directed to queue $80_2$ and Layer N Δ packets are directed to queue $80_N$.

As presented in the example of FIG. 5, not all of the packets in each of the layers have arrived at a selected point in time, at the receiving end. With respect to the base layer, all of the frames have arrived. With respect to layer 1, the packets respective of frame 0, frame 1 and frame M have arrived and the packet respective of frame 2 has not. With respect to layers 2 and N, the packets respective of frame 0 and frame M have arrived and the packets respective of frames 1 and 2 have not.

Accordingly, the output pictures for frames 0 and M can be provided at the highest quality, the output picture for frame 1 can be provided at the second lowest quality (layer 1) and the output picture for frame 2 can only be provided at the lowest quality (layer 0).

Layer assembler 78, retrieves the frame representations from all of the queues 80 and produces a media stream at the output thereof.

Figure 6:
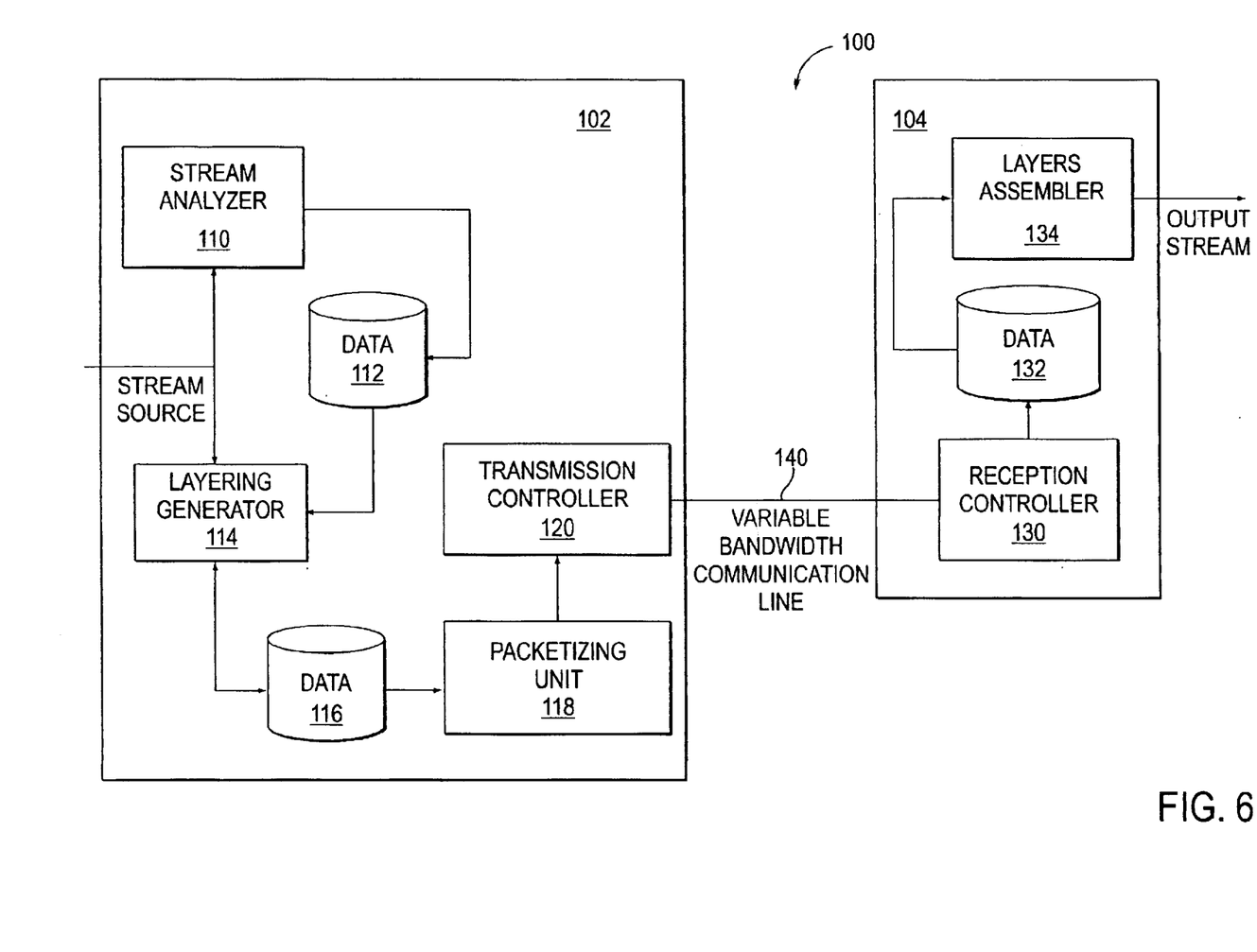
FIG. 6 is a schematic illustration of an apparatus, constructed and operative in accordance with another preferred embodiment of the present invention.

Reference is now made to FIG. 6, which is a schematic illustration of an apparatus, generally referenced 100, constructed and operative in accordance with another preferred embodiment of the present invention. FIG. 6 provides an overview of an entire apparatus for transmitting and receiving a media stream over a variable bandwidth channel.

Apparatus 100 includes a transmission system 102 and a reception system 104. Transmission system 102 includes a stream analyzer 110, a layer structure storage unit 112, a layering generator 114, a layer storage unit 116, a packetizing unit 118 and a transmission controller 120. Layer structure storage unit 112 is connected to stream analyzer 110 and to a layering generator 114. Layer storage unit 116 is connected between layering generator 114 and packetizing unit 118. Packetizing unit 118 is further connected to transmission controller 120. Stream analyzer 110 and layering generator 114 are both connected to a stream source.

Reception system 104 includes a reception controller 130, a storage unit 132 and a layer assembler 104. Storage unit is connected to reception controller 130 and to layer assembler 104. Reception controller is connected to transmission controller via a variable bandwidth channel, referenced 140.

It is noted that transmission system 102 and reception system 104 can be located at two ends of a communication channel of any given distance or co-exist in the same machine.

Stream analyzer 110 receives a media stream, which can include a video stream, an audio stream, a media command stream or a data stream. Stream analyzer 110 processes the stream and determines a set of compression command, which are directed at multi-layer compression of the received media stream, in accordance with a plurality of requirements such as minimal quality limit, minimal bandwidth limit, and the like.

The set of compression command is then stored in layer structure storage unit 112. Layering generator 114 retrieves the set of commands from storage unit 112 and compresses the incoming media stream, according to the quantizing scale values set forth by stream analyzer 110. It is noted that the incoming media stream can either be non-compressed or compressed media stream (such as an MPEG compressed stream). Layering generator 114 stores the produced layers in storage unit 116.

Packetizing unit 118 retrieves portions of the layers stored in storage unit 116 and produces packets which are then transmitted by transmission controller 120 to reception controller 130, via over channel 40. Reception controller 130 stores the received packets in storage unit 132. Layer assembler 134 retrieves frame data, according to layers, from the packets in storage unit 132 and reassembles a valid media stream therefrom. It is noted that this valid media stream is at most at the quality of the incoming media stream, provided to stream analyzer 110.

Figure 7:
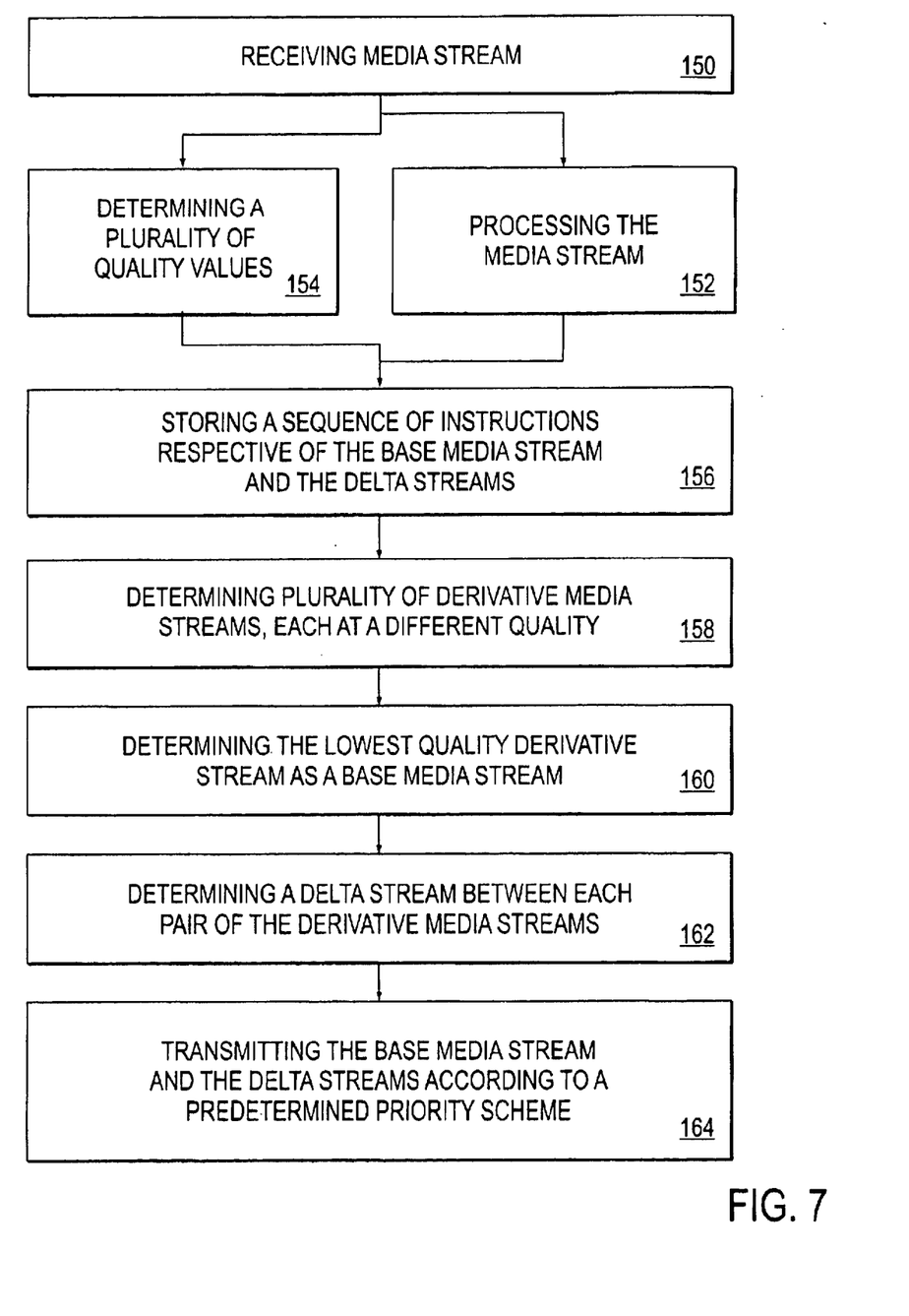
FIG. 7 is an illustration of a method for operating the transmission system of the apparatus of FIG. 6, operative in accordance with another preferred embodiment of the present invention.

References further made to FIG. 7, which is an illustration of a method for operating the transmission system of the apparatus of FIG. 6, operative in accordance with another preferred embodiment of the present invention. It is noted that the steps as listed in conjunction with this method are described for a single media stream. Nonetheless, as will be described further below, these steps apply for a structure, which processes a plurality of media streams and combines them for joined transmission over a single communication line.

In step 150, a media stream is received. With reference to FIG. 6, stream analyzer 110 receives a media stream. The media stream is provided either in a full or compressed format. In case where the received stream is provided in an analog format or in a digitized non-compressed format, then, preliminary digitization and compression procedures can be applied thereon.

The received media stream is processed (step 152) and a plurality of quantizing values, respective of quality values, are determined (step 154). With reference to FIG. 6, stream analyzer 110 processes the media stream and determines preliminary parameters, which will be later used in the layering procedure. These values can be stored in storage unit 112 or used immediately (step 156).

In step 158, a plurality of derivative media streams are determined, each at a different quality, according to a respective quantizing value. It is noted that the quantizing value can be determined for each frame or even each macro-block. With reference to FIG. 6, layering generator produces a plurality of streams, each according to the previously determined quantizing values (FIGS. 2A, 2B, 2C, 2D and 2E).

In step 160, the lowest quality derivative stream is determined as a base media stream. With reference to FIG. 6, the layering generator 114 determines the highest quantizing value stream as a base stream layer (FIGS. 2A and 3A).

In step 162, a delta (Δ) stream is determined between each pair of pair of successive derivative media streams. With reference to FIG. 6, the layering generator determines a Δ stream layer for each pair of successive derivative media streams (FIGS. 3B, 3C, 3D and 3E). The base layer and the delta layers can further undergo a packetizing procedure, with respect to predetermined communication or transport protocols, by packetizing unit 118 (see also FIG. 5).

In step 164, the base layer media stream and the respective delta layers are transmitted over a communication channel, according to a predetermined priority scheme. With reference to FIG. 6, the transmission controller transmits the base and delta layers over the variable bandwidth transmission line 140.

Figure 8:
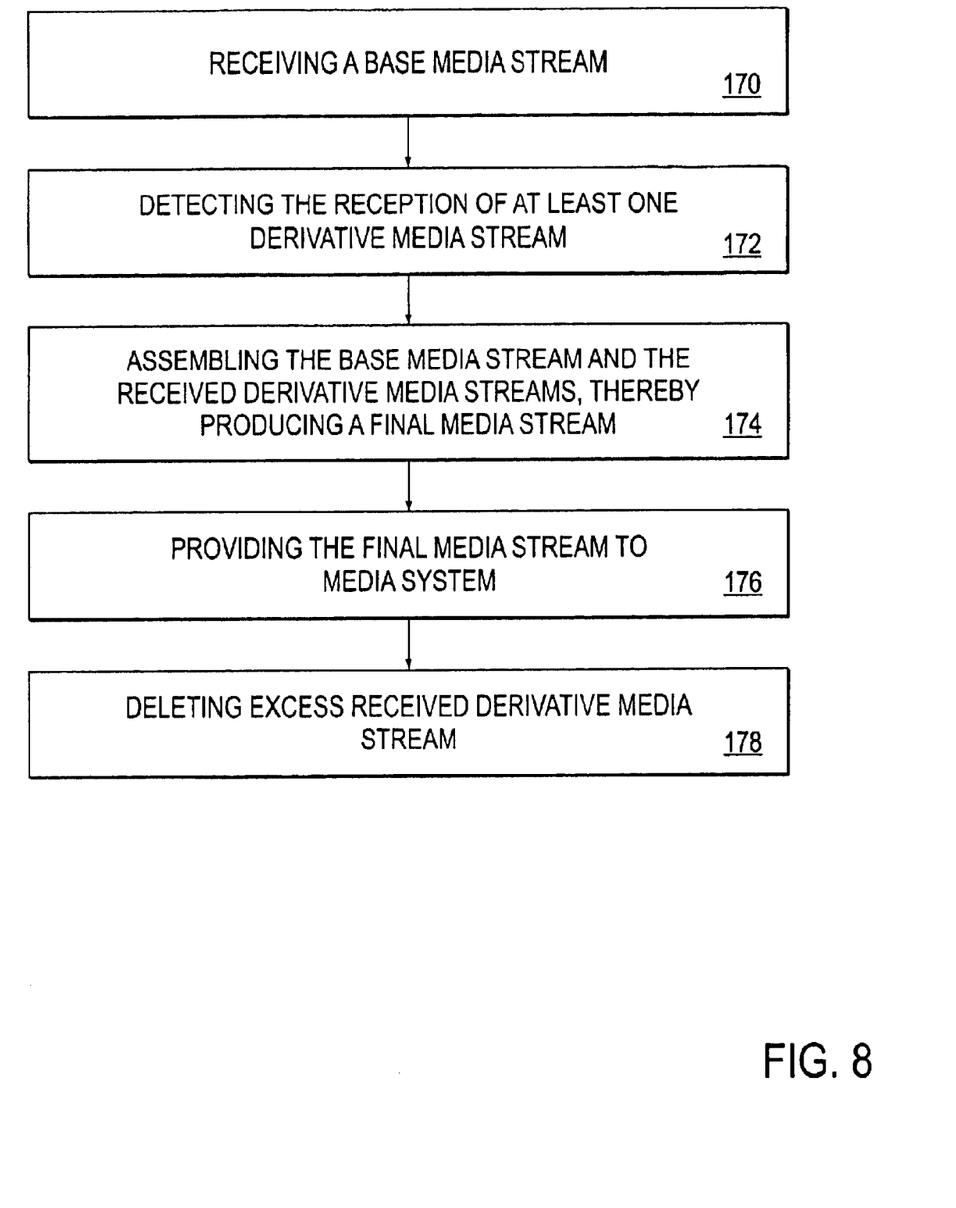
FIG. 8 is an illustration of a method for operating the reception system of the apparatus of FIG. 6, operative in accordance with another preferred embodiment of the present invention.

Reference is further made to FIG. 8, which is an illustration of a method for operating the reception system of the apparatus of FIG. 6, operative in accordance with another preferred embodiment of the present invention.

In step 170, a base media stream is received. It is noted that the compression of the base media stream is directed to comply at all times with the minimal bandwidth, which is available over the communication line. With reference to FIG. 6, the reception controller 130 receives a plurality of packets, which comprise the base layer respective of the lowest quality media stream.

In step 172, the reception of at least one derivative media stream is detected. With reference to FIG. 6, the reception controller 130 detects the presence of incoming packets, respective of layers, higher than the base layer. It is noted that the base layer packets as well as any received delta layer packets can be stored in storage unit 132.

In step 174, the base media layer frames are combined with respective and consecutive delta layer frames, so as to form a valid media stream. With reference to FIG. 6, the layers assembler 134 retrieves packets from storage unit 132 and reconstructs a valid media stream therefrom.

In step 178, excess derivative media information is deleted. With respect to FIG. 6, the reception controller deletes received packets which were not used during media stream reconstruction and the transmission controller 120 discards packets, which were not transmitted within a predetermined time period.

It is noted that the above layering scheme can be applied to any bit-costly aspect, such as include or exclude fields, temporal resolution, spatial resolution, luminance or chrominance, and a combination thereof.

In accordance with another aspect of the present invention, there is provided a method, which manages the transmission of a plurality of media streams over a single communication line.

Figure 9A:
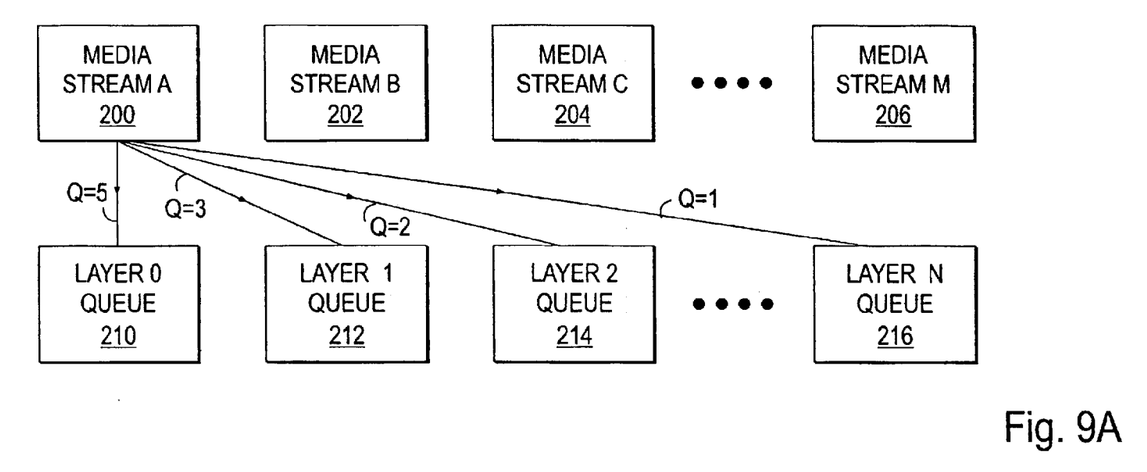
FIGS. 9A, 9B, 9C and 9D, each provide a schematic illustration of the layering distribution of a different media stream on the same set of layers, at different quantizing values.

Reference is to FIGS. 9A, 9B, 9C and 9D, each providing a schematic illustration of the layering distribution of a different media stream on the same set of layers, at different quantizing values. With reference to FIG. 9A, the streams to be processed include M media streams, referenced 200 (media stream A), 202 (media stream B), 204 (media stream C) and 206 (media stream M). The layer structure includes N layers, arranged in N queues referenced 210 (layer 0 queue), 212 (layer 1 queue), 214 (layer 2 queue) and, 216 (layer N queue).

Media stream A 200 is processed according to the following quantizing values Q=5 (base layer—reference 210), Q=3 (first delta layer—reference 212), Q=2 (second delta layer—reference 214) and Q=1 (last delta layer—reference 216), which ultimately yields the original, highest quality media stream, as received before processing.

Figure 9B:
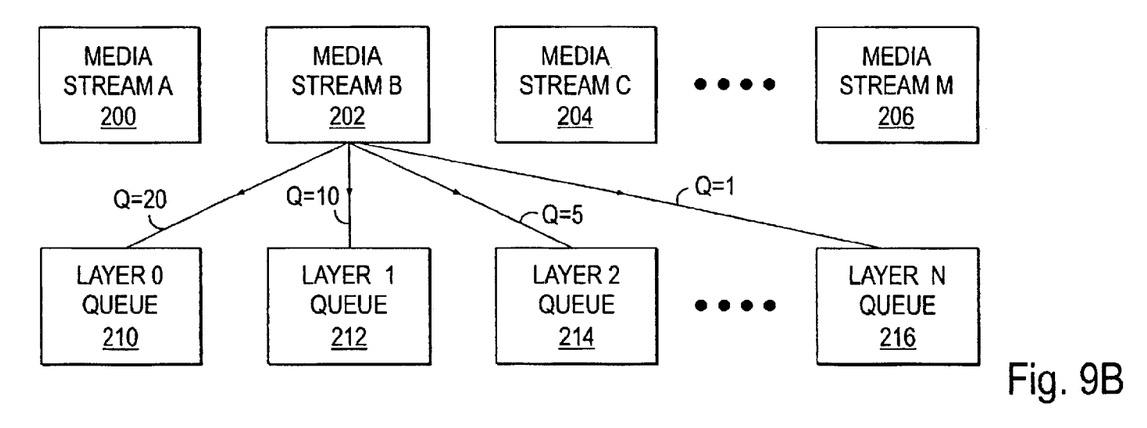

With reference to FIG. 9B, media stream B 202 is processed according to the following quantizing values Q=20 (base layer—reference 210), Q=10 (first delta layer—reference 212), Q=5 (second delta layer —reference 214) and Q=1 (last delta layer—reference 216).

It is noted that, statistically, the arrangement as presented in FIGS. 9A and 9B provides higher quality priority to media stream A over media stream B, which at the base layer is compressed according to a quantizing value of Q=5, guaranteed to be received at the receiving end, where media stream B is compressed at a quantizing value of Q=20 at the base layer and only the second delta layer represents a compression at a quantizing value of Q=5. This inherent characteristic of the present invention provides a user with control over the priority, regarding quality, which can be set for each of the media streams, before transmission.

Figure 9C:
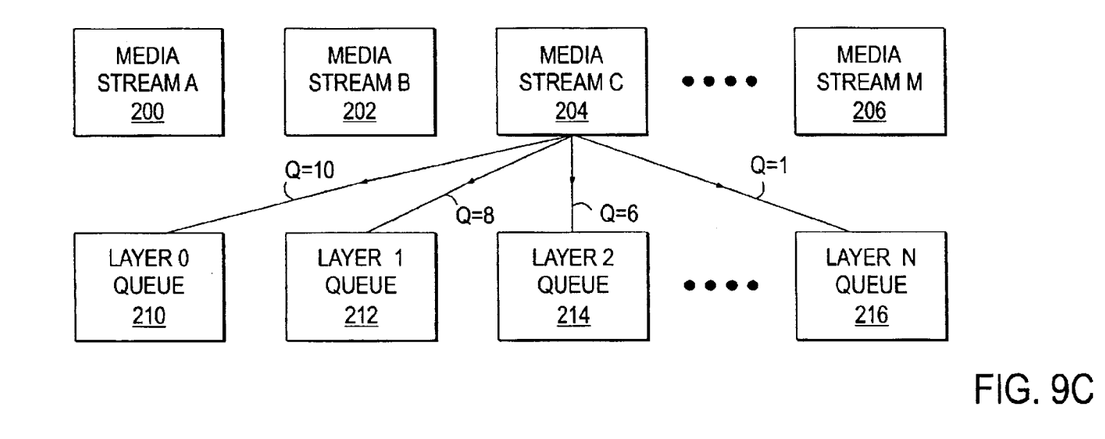

With reference to FIG. 9C, media stream C 204 is processed according to the following quantizing values Q=10, Q=8, Q=6 and Q=1. Comparing with the quantizing schemes of FIGS. 9A and 9B, the "upgrading" scheme of each of the streams, can also be prioritized, where the first delta layer of one stream is quantized at a higher level than that of another stream, thus ensuring that given a selected bandwidth, one stream will be reconstructed at a higher quality than the other.

Figure 9D:
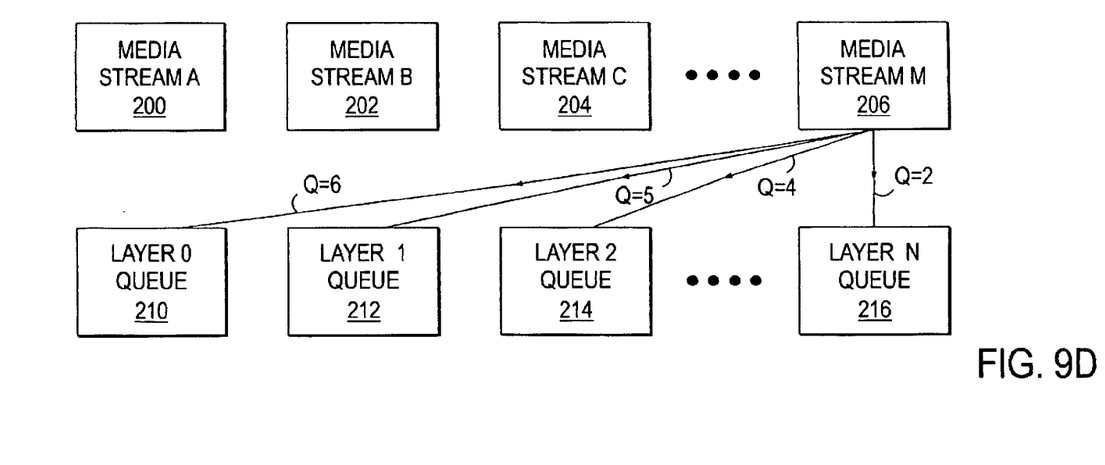

With reference to FIG. 9D, media stream D 206 is processed according to the following quantizing values Q=6, Q=5 Q=4 and Q=2. This layer quantizing scheme assumes that a bandwidth, suitable for Q=1 will most probably not be available, but a bandwidth for Q=2 will be. In that case, the highest delta layer is compressed at Q=2 rather than Q=1.

Figure 10:
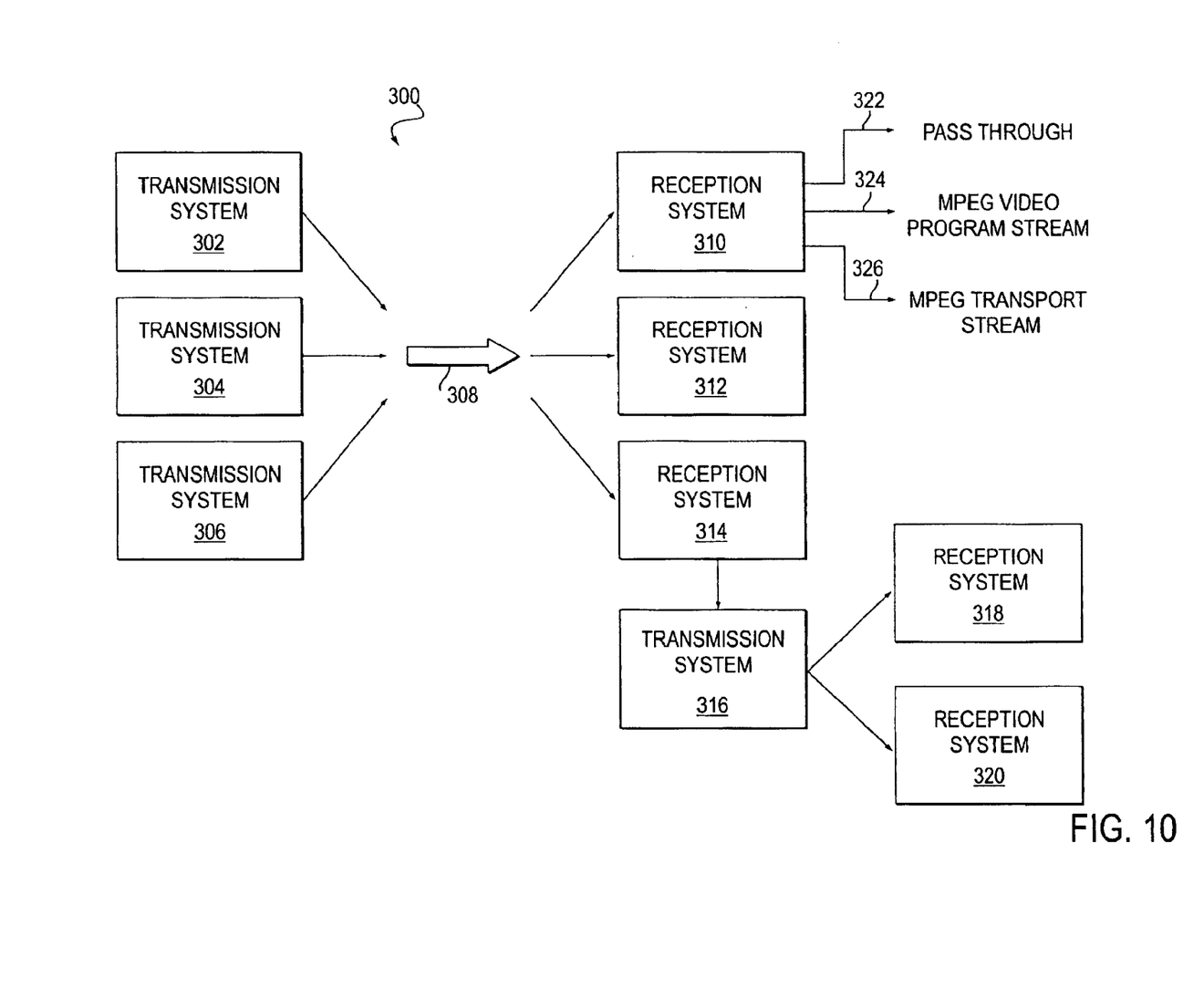
FIG. 10, which is a schematic illustration of an apparatus, down streaming media through a plurality of communication channels, constructed and operative in accordance with another preferred embodiment of the present invention.

Reference is now made to FIG. 10, which is a schematic illustration of an apparatus, generally referenced 300 for down streaming media through a plurality of communication channels, constructed and operative in accordance with another preferred embodiment of the present invention. System 300 includes a plurality of transmission systems 302, 304, 306 and 316 and a plurality of reception systems 310, 312, 314, 318 and 320. Each of the transmission system 302, 304 and 306 processes a plurality of media streams at a plurality of quantization levels and transmits them over a high capacity channel, generally referenced 308, to reception systems 310, 312 and 314. It is noted that each of the transmissions of each of the transmission systems 302, 304 and 306 can be received at any of the reception systems 310, 312 and 314.

Each of the reception systems 310, 312 and 314 can provide the received data in a plurality of formats such as pass through, referenced 322 (e.g., the data further sent as it was received), MPEG video program stream, referenced 324 or a converted MPEG transport stream, referenced 326.

It is noted that the received data can further be processed into new layers and transmitted further to a new location over a multi-channel network. An example is set by transmission system 316, which receives an assembled media stream from reception system 314. Transmission system 316 processes the received media stream into a plurality of layers and further transmits them to reception systems 318 and 320. It is noted that the quality of the result of this further transmission can not exceed the quality of the streams as received by reception system 314.

Figure 11:
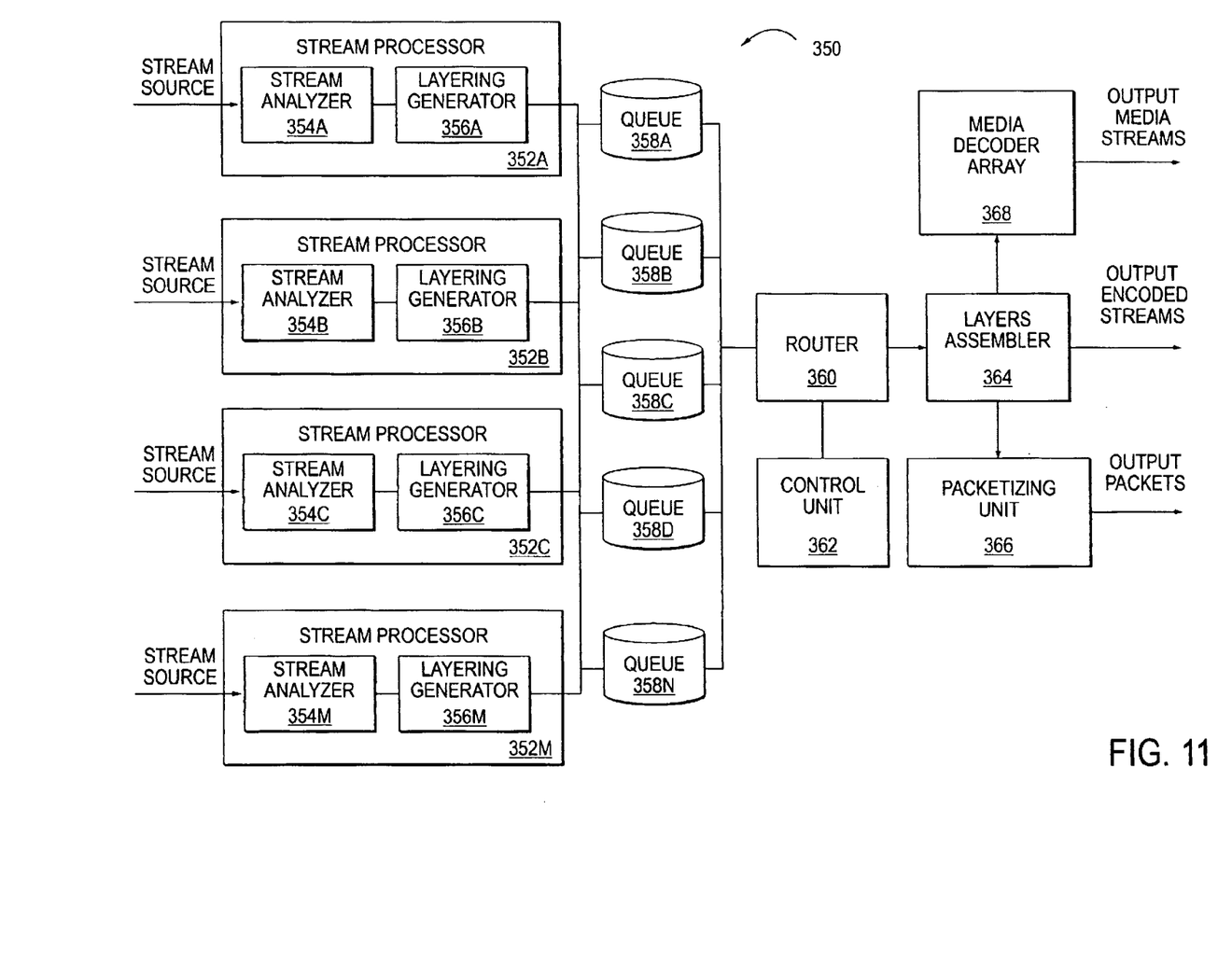
FIG. 11 is a schematic illustration of a video re-multiplexing system, constructed and operative in accordance with another preferred embodiment of the present invention.

Reference is now made to FIG. 11, which is a schematic illustration of a video re-multiplexing system, generally referenced 350, constructed and operative in accordance with another preferred embodiment of the present invention.

System 350 includes a plurality of stream processors 352A, 352B, 352C and 352N, a plurality of queue units 358A, 358B, 358C, 358D and 358N, a router 360, a control unit 362, a layer assembler 364, a packetizing unit 366 and a media decoder array 368.

Each of stream processors 352A, 352B, 352C and 352N includes a stream analyzer unit, generally referenced 354 and a layering generator, generally referenced 356, respectively connected there between.

Layering generators 352A, 352B, 352C and 352N are all connected to queues 358A, 358B, 358C, 358D and 358N. It is noted that each of the layering generators can produce layers at a number, which does not exceed the number of the queues.

Queues 358A, 358B, 358C, 358D and 358N are all connected to router 360. It is noted that router 360 can be replaced with a respective switch, for enhanced speed. Router 360 is further connected to control unit 362 and to layer assembler 364. Layer assembler 364 is further connected to media decoder array 368 and to packetizing unit 366.

Each of stream analyzers 358A, 358B, 358C and 358M receives a media stream from a respective stream source. Each stream analyzer analyzes the received media stream and determines how and to what extent should that stream be layered. The decision can be performed according to a plurality of parameters such as the complexity of the information embedded in the stream, the priority which this stream has over the rest of the media streams, the allocated media stream bandwidth, the allocated overall communication channel bandwidth, and the like.

The layering generator 352, connected to each of the stream analyzers 354 performs the actual layering process and determination of the base layer and the associated differential (delta) layers. Each layering generator 356 then distributes all of the generated layers between the queues 358A, 358B, 358C, 358D and 358N, where the base layer from each layering generator is stored in queue 358A, the first delta layer is stored in queue 358B and so on. Router 360 retrieves layered media data from each of the queues 358A, 358B, 358C, 358D and 358N, according to a scheme multiplexing scheme received from the control unit 362.

Layer assembler 364 reconstructs each of the streams to the extent available with respect to the retrieved layers. It is noted that the content of some queues, of higher order (higher layers) can be discarded, in accordance with a plurality of parameters such as time limit, volume limit, importance criterions and the like. Layer assembler 364 provides the reassembled streams in an encoded format as output.

Layer assembler 364 further provides the reassembled streams to packetizing unit 366 and to media decoder array 368. Packetizing unit 366 encapsulates portions of the reassembled streams, according to any desired communication protocol such as Ethernet, ATM, TCP/IP, MPEG-Transport and the like. Media decoder array includes a plurality of decoding units (not shown) each decoding a selected one of the streams and providing it as output in the form of a media stream. Accordingly, the system 350 operates a stream multiplexer, which is able to multiplex a plurality into a given bandwidth, CBR or VBR, without wasting any bandwidth volume.

It is noted that the method and apparatus according to the present invention can be implemented either in hardware, in software or in a combination thereof.

It will be appreciated by persons skilled in the art that the present invention is not limited to what has been particularly shown and described hereinabove. Rather the scope of the present invention is defined only by the claims, which follow.

What is claimed is:

1. A method for providing scalable bandwidth transmission of a media stream comprising:
   determining a plurality of quantization levels for said media stream; and
   defining the highest level of quantization of said quantization levels as a base level.

2. The method according to claim 1, further comprising:
   quantizing the media stream according to the plurality of quantization levels, thereby producing a plurality of quantized versions of the media stream; and
   defining a selected quantized version as a base layer, the selected quantized version being quantized according to the base level.

3. The method according to claim 2, further comprising producing a supplemental layer for each successive pair of quantized versions.

4. The method according to claim 2, further comprising providing the base layer as a reconstructed media stream.

5. The method according to claim 3, further comprising producing a reconstructed media stream from the base layer and at least a portion of at least one of the supplemental layers.

6. The method according to claim 2, further comprising transmitting the base layer to a remote location.

7. The method according to claim 3, further comprising transmitting the base layer and at least a portion of at least one of the supplemental layers to a remote location.

8. The method according to claim 5, further comprising transmitting the reconstructed media stream to a remote location.

9. The method according to claim 5, further comprising packetizing the reconstructed media stream.

10. The method according to claim 9, further comprising transmitting the packetized reconstructed media stream to a remote location.

11. The method according to claim 1, wherein the media stream comprises one of the list consisting of:
    MPEG encoded media stream;
    original media stream;
    JPEG media stream;
    video stream;
    audio stream;
    data stream; and
    a stream containing a plurality of streams.

12. A method, comprising: reconstructing a portion of a media stream from a portion of a base layer stream and a respective portion of at least one supplemental layer stream by adding the respective portion of at least one supplemental layer stream to the base layer stream, the base layer stream being a selected one of a plurality of quantized versions of the media stream representing a highest level of quantization for the media stream.

13. A method for providing scalable bandwidth transmission of a plurality of media streams, the method comprising:
    determining a group of quantization levels for each media stream; and
    defining the highest level of quantization of the quantization levels of each media stream, as a base level thereof.

14. The method according to claim 13, further comprising:
    quantizing each media stream according to a respective one of the group's quantization levels, producing a group of quantized versions, for each of the media streams; and
    defining a selected one of the quantized versions of a selected group of quantized versions as a base layer, the selected quantized version being quantized according to the base level of the selected group of quantization levels.

15. The method according to claim 14, further comprising producing a supplemental layer for each successive pair of the quantized versions of a selected group, thereby defining a group of supplemental layers.

16. The method according to claim 14, further comprising associating between portions of different base layers.

17. The method according to claim 15, further comprising:
    associating between portions of different base layers; and
    associating between portions of different supplemental layers of the same order, of different groups.

18. The method according to claim 16, further comprising providing the portions of the associated base layers as reconstructed media streams.

19. The method according to claim 17, further comprising producing reconstructed media streams, each from a respective one of the portions of the associated base layers and from at least one of a respective one of the portions of the supplemental layers.

20. The method according to claim 16, further comprising transmitting the associated portions of the base layers to a remote location.

21. The method according to claim 17, further comprising transmitting the associated portions of the base layers and at least one selected associated portion of the supplemental layers, to a remote location.

22. The method according to claim 19, further comprising transmitting the reconstructed media streams to a remote location.

23. The method according to claim 19, further comprising packetizing the reconstructed media streams.

24. The method according to claim 23, further comprising transmitting the packetized reconstructed media streams to a remote location.

25. The method according to claim 13, wherein the media stream comprises one of the list consisting of:
   MPEG encoded media stream;
   original media stream;
   JPEG media stream;
   video stream;
   audio stream;
   data stream; and
   a stream containing a plurality of streams.

26. A method for reconstructing portions of media streams from portions of base layer streams and respective portions of at least one supplemental layer stream, comprising:
   detecting an association between each base layer stream and a respective portion of at least one supplemental layer stream; and
   adding each base layer stream and the respective portion of at least one supplemental layer stream, each base layer stream being a selected one of a plurality of quantized versions of its respective media stream representing a highest level of quantization for the respective media stream.

27. A scalable bandwidth transmission media stream generating apparatus comprising:
   a media analyzer; and
   a layering generator connected to the media analyzer, the media analyzer receiving a media stream and determining a layering structure therefore, the layering generator processing the media stream according to the layering structure, thereby producing a base layer and a plurality of supplemental layers, the base layer being a selected one of a plurality of quantized versions of the media stream.

28. The scalable bandwidth transmission media stream generating apparatus according to claim 27, further comprising a storage unit, connected to the layering generator, wherein the storage unit has a plurality of queues, each of the queues storing a selected base layer and supplemental layer.

29. The scalable bandwidth transmission media stream generating apparatus according to claim 28, further comprising a routing controller, connected to the storage unit, for retrieving selected successive base layers and supplemental layers.

30. The scalable bandwidth transmission media stream generating apparatus according to claim 29, further comprising a layer assembler, connected to the routing controller, for producing a reconstructed media stream from the base layer and at least one successive supplemental layer, received from the routing unit.

31. A scalable bandwidth transmission media stream generating apparatus, comprising:
   a plurality of media analyzers;
   a plurality of layering generators, each associated with and connected to a selected one of the media analyzers, each of the media analyzers receiving a different media stream and determining a layering structure therefore, each of the layering generators processing the media stream according to the layering structure, thereby producing a base layer and a plurality of supplemental layers, the base layer being a selected one of a plurality of quantized versions of the media stream.

32. The scalable bandwidth transmission media stream generating apparatus according to claim 31, further comprising a storage unit, connected to the layering generator, wherein the storage unit has a plurality of queues, each of the queues storing a selected base layer and supplemental layer.

33. The scalable bandwidth transmission media stream generating apparatus according to claim 32, further comprising a routing controller, connected to the storage unit, for retrieving selected successive base layers and supplemental layers.

34. The scalable bandwidth transmission media stream generating apparatus according to claim 33, further comprising a layer assembler array, connected to the routing controller, for producing a reconstructed media stream from the base layers and at least one successive supplemental layer, received from the routing unit.

35. A method for providing scalable bandwidth transmission of a plurality of media streams, via a fixed bandwidth communication channel, comprising:
   determining a group of quantization levels for each media stream;
   defining a highest level of quantization of the group of quantization levels as a base level thereof, wherein the total sum of quantized versions of the media streams according to each media stream's base level, at any point in time, is less than said fixed bandwidth.

36. The method according to claim 35, further comprising:
   quantizing each media stream according to the group of quantization levels, thereby producing a group of quantized versions, for each media stream; and
   defining a selected quantized version of a selected group of quantized versions as a base layer, the selected quantized version being quantized according to the base level, of the selected group of quantization levels.

37. The method according to claim 36, further comprising producing a supplemental layer for each successive pair of quantized versions of the selected group, thereby defining a group of supplemental layers.

38. The method according to claim 36, further comprising associating between portions of different base layers.

39. The method according to claim 37, further comprising: associating between portions of different base layers; and
   associating between portions of different supplemental layers of the same order, of different groups.

40. The method according to claim 38, further comprising providing portions of associated base layers as reconstructed media streams, where the total sum of bandwidths of each reconstructed media stream does not exceed the fixed bandwidth.

41. The method according to claim 39, further comprising producing reconstructed media streams, each from a respective portion of the associated base layers and from at least one of a respective portion of the supplemental layers, wherein the total sum of bandwidths of each reconstructed media stream does not exceed the fixed bandwidth.

42. The method according to claim 38, further comprising transmitting associated portions of the base layers to a remote location, wherein the total sum of bandwidths of associated portions of the base layers do not exceed the fixed bandwidth.

43. The method according to claim 39, further comprising transmitting associated portions of the base layers and at least selected associated portions of the supplemental layers to a remote location, wherein the total sum of bandwidths of associated portions of the base layers and at least one selected associated portion of the supplemental layers does not exceed said fixed bandwidth.

44. The method according to claim 41, further comprising transmitting reconstructed media streams to a remote location, wherein the total sum of bandwidths of each reconstructed media stream does not exceed the fixed bandwidth.

45. The method according to claim 41, further comprising packetizing the reconstructed media streams.

46. The method according to claim 45, further comprising transmitting packetized reconstructed media streams to a remote location wherein the total sum of bandwidths of each reconstructed media stream does not exceed the fixed bandwidth.

47. The method according to claim 35, wherein said media stream comprises one of the list consisting of:
   MPEG encoded media stream;
   original media stream;
   video stream;
   audio stream;
   data stream; and
   a stream containing a plurality of streams.

48. The method of claim 35 wherein each media stream comprises multiple media stream components and wherein each media stream component is represented by a base layer stream component and at least one supplemental layer stream component.

49. The method of claim 48 further comprising transmitting at least a base layer stream component and at least one supplemental layer stream component to a remote location.

50. The method of claim 48 wherein the step of transmitting a media component comprises providing a base layer stream component and at least one supplemental layer stream component and routing the stream components according to a routing scheme.

51. The method of claim 50 further comprising assigning higher quantization layer stream components with higher priority.

52. The method of claim 50 further comprising discarding media components that are not transmitted during a predetermined period of time.

53. A method according to any claim out of claims 48, 49, 50, 51 or 52 wherein the stream components are frames.

54. A method according to any claim out of claims 48, 49, 50, 51 or 52 wherein the stream components are macroblocks.

55. A method according to any claim out of claims 48, 49, 50, 51 or 52 wherein the stream components are slices.

56. A method according to any claim out of claims 48, 49, 50, 51 or 52 wherein the stream components are fields.

57. A method according to any claim out of claims 48, 49, 50, 51 or 52 wherein the method does not comprise a step of measuring an available bandwidth during a transmission of media stream components.

58. The apparatus of claim 27 wherein each media stream comprises multiple media stream components and wherein the apparatus is operable to produce, from each media stream component a base layer stream component and at least one supplemental layer stream component.

59. The apparatus of claim 58 wherein the apparatus is capable of transmitting at least a base layer stream component and at least one supplemental layer stream component to a remote location.

60. The apparatus of claim 58 wherein the apparatus is capable of providing a base layer stream component and at least one supplemental layer stream component and routing the stream components according to a routing scheme.

61. The apparatus of claim 60 further capable of assigning higher quantization layer stream components with higher priority.

62. The apparatus of claim 60 further capable of discarding media components that are not transmitted during a predetermined period of time.

63. An apparatus according to any claim out of claims 58, 59, 60, 61 or 62 wherein the stream components are frames.

64. An apparatus according to any claim out of claims 58, 59, 60, 61 or 62 wherein the stream components are macroblocks.

65. An apparatus according to any claim out of claims 58, 59, 60, 61 or 62 wherein the stream components are slices.

66. An apparatus according to any claim out of claims 58, 59, 60, 61 or 62 wherein the stream components are fields.

67. An apparatus according to any claim out of claims 58, 59, 60, 61 or 62 wherein the apparatus does not comprise a step of measuring an available bandwidth during a transmission of media stream components.

* * * * *